(12) United States Patent
Papaefstathiou et al.

(10) Patent No.: US 8,902,255 B2
(45) Date of Patent: Dec. 2, 2014

(54) MOBILE PLATFORM FOR AUGMENTED REALITY

(75) Inventors: Efstathios Papaefstathiou, Redmond, WA (US); Russell Sanchez, Seattle, WA (US); Nathaniel Clinton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 13/163,677

(22) Filed: Jun. 18, 2011

(65) Prior Publication Data

US 2012/0320033 A1 Dec. 20, 2012

(51) Int. Cl.
*G09G 5/00* (2006.01)
*G06T 19/00* (2011.01)

(52) U.S. Cl.
CPC ............................ *G06T 19/006* (2013.01)
USPC .......................................... 345/633; 345/419

(58) Field of Classification Search
USPC .................. 345/633, 419; 701/23, 25–26
See application file for complete search history.

(56) References Cited

U.S. PATENT DOCUMENTS

| | | | |
|---|---|---|---|
| 6,285,317 B1 * | 9/2001 | Ong | 342/357.57 |
| 6,677,956 B2 * | 1/2004 | Raskar et al. | 345/581 |
| 7,818,091 B2 | 10/2010 | Kazi et al. | |
| 2007/0071311 A1 * | 3/2007 | Rovira-Mas et al. | 382/154 |
| 2010/0191457 A1 * | 7/2010 | Harada | 701/201 |
| 2010/0321478 A1 | 12/2010 | Sliwa et al. | |
| 2011/0026833 A1 | 2/2011 | Sugino et al. | |

OTHER PUBLICATIONS

Harrison, et al., "High Quality 3D Laser Ranging Under General Vehicle Motion", Retrieved Apr. 1, 2011 at <<http://ieeexplore.ieee.org/stamp/stamp.jsp?tp=&arnumber=4543179>>, IEEE International Conference on Robotics and Automation, May 19-23, 2008, pp. 7-12.

Sheh, et al., "A Low-Cost, Compact, Lightweight 3D Range Sensor", Retrieved Apr. 1, 2011 at <<http://www.araa.asn.au/acra/acra2006/papers/paper_5_59.pdf>>, Australasian Conference on Robotics and Automation, Dec. 1, 2006, 8 Pages.

May, et al., "3D Time-of-Flight Cameras for Mobile Robotics", Retrieved Apr. 1, 2011 at <<http://ieeexplore.ieee.org/stamp/stamp.jsp?tp=&arnumber=4058457>>, International Conference on Intelligent Robots and Systems, Oct. 9-15, 2006, pp. 790-795.

(Continued)

*Primary Examiner* — Maurice L McDowell, Jr.
(74) *Attorney, Agent, or Firm* — Judy Yee; Steve Wight; Micky Minhas

(57) ABSTRACT

A mobile image processing manager may include an image data receiving engine configured to obtain a first set of three-dimensional (3-D) image data associated with an observation environment. The mobile image processing manager may also include a navigational plan engine configured to determine a navigational plan based on the first set. A navigation manager may be configured to initiate a navigation event based on the navigational plan. A scene determination engine may be configured to determine a first group of one or more graphical images. An image projection engine may be configured to initiate a display of the first group on a first surface, the display based on a light source.

20 Claims, 12 Drawing Sheets

(56) References Cited

OTHER PUBLICATIONS

Muller, et al., "The Accuracy of 6D SLAM using the AIS 3D Laser Scanner", Retrieved Apr. 1, 2011 at <<http://ieeexplore.ieee.org/stamp/stamp.jsp?tp=&arnumber=4042064>>, IEEE International Conference on Multisensor Fusion and Integration for Intelligent Systems, Sep. 3-6, 2006, pp. 389-394.

Lee, et al., "A 3D IR Camera with Variable Structured Light for Home Service Robots", Retrieved Apr. 1, 2011 at <<http://www.araa.asn.au/acra/acra2006/papers/paper_5_59.pdf>>, Proceedings of the 2005 IEEE International Conference on Robotics and Automation, Apr. 2005, pp. 1859-1864.

Wulf, et al., "Fast 3d Scanning Methods for Laser Measurement Systems", Retrieved Apr. 1, 2011 at <<http://www.rts.uni-hannover.de/images/5/5f/Wulf03-CSCS.pdf>>, Proc. International Conference on Control Systems and Computer Science (CSCS14), 2003, 6 Pages.

* cited by examiner

MOBILE PLATFORM FOR AUGMENTED REALITY

BACKGROUND

Many augmented reality applications have developed over time as computers have increasingly been incorporated in daily activities. For example, many television sportscasters currently provide additional graphics or text aids onscreen to enhance an ongoing sporting event (e.g., in real time). For example, colored lines may be added to a transmission of a live football game to indicate boundaries of yardage to complete a first down in the current play. For this example, real-world elements include the football field and players, and virtual elements include the colored lines, which augment the image in real time.

As another example, current scores of games may be superimposed over the top of a transmission of an event. Sports commentators may use virtual pointers to superimpose pointer icons onto a game transmission to indicate various entities of interest as the sporting event progresses (e.g., dog on playing field, player roughhousing another player). Swimming event telecasters may add a line across the swimming lanes to indicate the position of the current record holder as a race proceeds to provide viewers with a comparison of the current race to the record holder performance.

SUMMARY

According to one general aspect, a mobile image processing manager may include an image data receiving engine configured to obtain a first set of three-dimensional (3-D) image data associated with an observation environment. The mobile image processing manager may also include a navigational plan engine configured to determine a navigational plan based on the first set. The mobile image processing manager may also include a navigation manager configured to initiate a navigation event based on the navigational plan. The mobile image processing manager may also include a scene determination engine configured to determine a first group of one or more graphical images. The mobile image processing manager may also include an image projection engine configured to initiate a display of the first group on a first surface, the display based on a light source.

According to another aspect, a first set of three-dimensional (3-D) image data associated with an environment and a 3-D image input device may be obtained. A navigational plan may be determined based on the first set, the navigational plan associated with navigation of a transporting device associated with the 3-D image input device. A first 3-D geometric arrangement associated with a plurality of objects included in the environment may be determined, based on the first set. A first group of one or more graphical images may be determined, based on the first 3-D arrangement. A projection display of the first group to one or more surfaces associated with one or more of the plurality of objects may be initiated. The display may be based on a light source and the first 3-D geometric arrangement.

According to another aspect, a computer program product tangibly embodied on a computer-readable medium may include executable code that may cause at least one data processing apparatus to obtain a first set of three-dimensional (3-D) image data associated with an observation environment and a 3-D image input device. Further, the data processing apparatus may determine a navigational plan based on the first set, the navigational plan associated with navigation of a transporting device associated with the 3-D image input device. Further, the data processing apparatus may determine a first 3-D geometric arrangement associated with a plurality of objects included in the environment, based on the first set. Further, the data processing apparatus may determine a first group of one or more graphical images, based on the first 3-D arrangement. Further, the data processing apparatus may initiate a display of the first group to one or more surfaces, the display based on a light source and the first 3-D geometric arrangement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Figure 1:
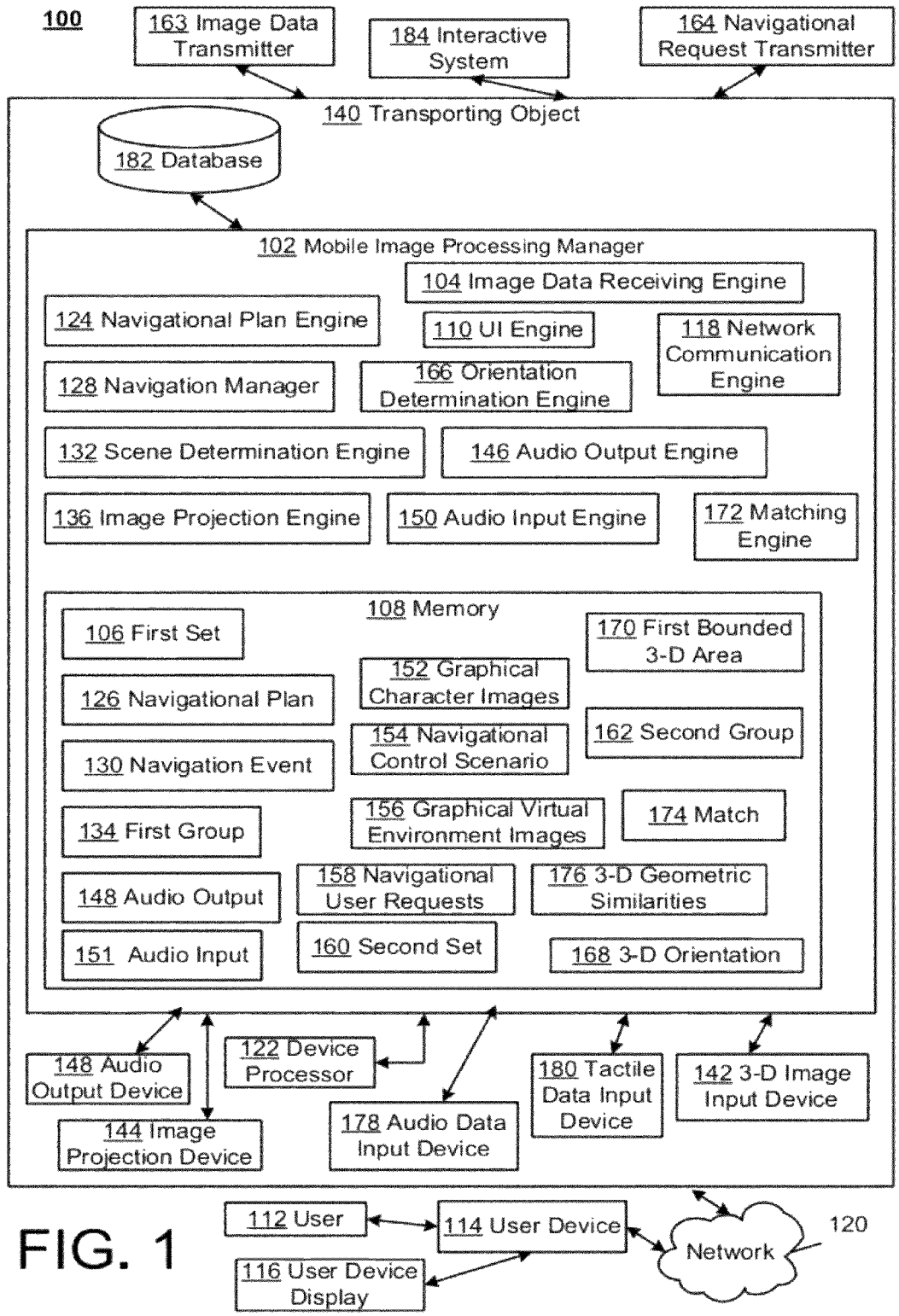
FIG. 1 is a block diagram of an example system for spatial object management.

Augmented reality applications may be desirable in many different scenarios. For example, a surgeon may wish to see a view of a diseased portion of a patient's vital organ, augmented with pointers to guide the surgeon in cutting only the diseased portion of the vital organ, as well as augmentation with predicted views of the organ after the incision, as the surgeon progresses through a surgery (e.g., real time prediction of surgery results based on the progress of the incision).

In this context, "augmented reality" may refer to a live direct or an indirect view of a physical, real-world environment whose elements are augmented by computer-generated sensory input, such as sound, graphics, odors, or changes in temperature.

Many users may thus desire an interactive environment. For example, a KINECT system (e.g., in two dimensions or with a two-dimensional display with three-dimensional enhancements) may provide an interaction landscape via a fixed screen (i.e., a television screen or projector). However, this scenario may involve a television or projector that lacks a capability to change its position or orientation. These static and manually aimed platforms may provide an augmented reality experience that may include imaginary or previously captured virtual environments. Handheld devices (e.g., a smart phone with a camera and display) involve an aiming action by a human for capturing an environment. Such systems may not include features based on the geometric aspects of the environment.

According to an example embodiment, example techniques discussed herein may provide a platform that can sense a visual environment (e.g., via a high resolution RGB sensor) and the geometry of the environment (e.g., via a depth sensor). Further, the platform may project high resolution imagery onto the environment to visually augment the environment via projection that may respect the geometry of the environment. According to an example embodiment, the example platform may also autonomously change its location and point of view, thus enabling a wide range of augmented reality scenarios such as gaming, home improvement, storytelling, art, and many other applications.

According to an example embodiment, the example platform may be controlled from remote locations to project images on its environment, and to send images to users at the remote locations.

According to an example embodiment, the example platform may collaborate with other interactive systems (e.g., via a KINECT system, via television display of images). According to an example embodiment, the example platform may send images and/or audio data (and other sensory data) associated with its environment to the other systems, so that the images (and other data) may be shared with others and/or may be displayed on a display device such as a television screen, a remote projector device, or a mobile device display.

According to an example embodiment, the example platform may provide a perception to a user that the platform is controlled by an imaginary character "inside" the platform, based on projecting images associated with the imaginary character on a display screen located on a device associated with transporting the platform (e.g., on a front portion of a body of a mobile robot).

As further discussed herein, FIG. 1 is a block diagram of an example system 100 for mobile processing of image data. As shown in FIG. 1, a mobile image processing manager 102 may include an image data receiving engine 104 that may be configured to obtain a first set 106 of three-dimensional (3-D) image data associated with an observation environment. For example, the observation environment may include an area that is within a line of sight of an image input device.

According to an example embodiment, the mobile image processing manager 102 may include a memory 108 that may store the first set 106. In this context, a "memory" may include a single memory device or multiple memory devices configured to store data and/or instructions. Further, the memory 108 may span multiple distributed storage devices.

According to an example embodiment, a user interface engine 110 may be configured to manage communications between a user 112 and the mobile image processing manager 102. The user 112 may be associated with a user device 114 that may be associated with a user device display 116 and other input/output devices. For example, the user device display 116 may be configured to communicate with the user device 114, via internal device bus communications, or via at least one network connection. For example, the user 112 may provide input via an input device associated with the user device 114 (e.g., a keyboard, touchpad, touchscreen, mouse click, audio input device for receiving voice input).

According to an example embodiment, the mobile image processing manager 102 may include a network communication engine 118 configured to manage network communication between the mobile image processing manager 102 and other entities that may communicate with the mobile image processing manager 102 via at least one network 120. For example, the at least one network 120 may include at least one of the Internet, at least one wireless network, or at least one wired network. For example, the at least one network 120 may include a cellular network, a radio network, or any type of network that may support transmission of data for the mobile image processing manager 102. For example, the network communication engine 118 may manage network communications between the mobile image processing manager 102 and the user device 114. For example, the network communication engine 118 may manage network communication between the user interface engine 110 and the user device 114.

According to an example embodiment, instructions associated with the mobile image processing manager 102 may be stored on computer-readable media, and may be executed, for example, via a device processor 122, as discussed further below.

In this context, a "processor" may include a single processor or multiple processors configured to process instructions associated with a processing system. A processor may thus include multiple processors processing instructions in parallel and/or in a distributed manner. Although the device processor 122 is depicted as external to the mobile image processing manager 102 in FIG. 1, one skilled in the art of data processing will appreciate that the device processor 122 may be implemented as a single component, and/or as distributed units which may be located internally or externally to the mobile image processing manager 102, and/or any of its elements.

The mobile image processing manager 102 may further include a navigational plan engine 124 that may be configured to determine a navigational plan 126 based on the first set 106. For example, the navigational plan engine 124 may determine the navigational plan 126 based on techniques associated with controlling movement toward, away from, around, or into various elements of an observation environment. For example, the navigational plan engine 124 may be configured to determine the navigational plan 126 based on instructions to capture image data associated with various objects in a house, and may recognize the various objects based on image matching techniques. For example, the navigation plan 126 may include instructions associated with controlling movement associated with a mobile platform (e.g., a robot).

A navigation manager 128 may be configured to initiate a navigation event 130 based on the navigational plan 126. For example, the navigation manager 128 may initiate a navigation event to turn left to avoid hitting an object in the observation environment. For example, the navigation manager 128 may initiate a navigation event to rotate a device holding a camera to a different angle to obtain a different view of an object in the observation environment.

A scene determination engine 132 may be configured to determine a first group 134 of one or more graphical images. For example, the scene determination engine 132 may determine a virtual environment scene that may include graphical images associated with virtual settings and virtual characters (e.g., animals, rocks, clouds, cliffs, sand, trees, bodies of water).

An image projection engine 136 may be configured to initiate a display of the first group 134 on a first surface, the display based on a light source. For example, the image projection engine 136 may initiate the display on a wall, on objects located within the observation environment, on a display associated with a body associated with the mobile processing manager 102, or on remote devices that may be located remotely from the observation environment.

According to an example embodiment, the first surface may include a transporting object surface that is located on a transporting object 140 associated with transportation of a 3-D image input device 142 associated with input of the first set 106, and an image projection device 144 associated with the display of the first group 134, in a navigational path based on the navigational plan 126 and the initiation of the navigation event 130.

For example, the 3-D image input device 142 may include a three-dimensional (3-D) image data device that may be configured to obtain 3-D spatial image data. For example, the 3-D image input device 142 may include a depth camera that may be configured to obtain image data that includes depth values. For example, a MICROSOFT KINECT camera may provide depth images at 30 Hz and a resolution of 640×480. For example, the camera may have a diagonal field-of-view of 70°. According to an example embodiment, an example system 100 may process each camera frame in less than 15 ms, thus providing real-time processing of the obtained images. As another example, the 3-D image input device 142 may include one or more cameras configured to obtain image data representing stereoscopic images that correspond to 3-D shapes.

For example, the transporting object 140 may include a mobile robot body.

According to an example embodiment, an audio output engine 146 may be configured to initiate transmission of an audio output 147 to an audio output device 148. According to an example embodiment, the audio output engine 146 may be configured to initiate transmission of the audio output 147 to other devices (e.g., the user device 114).

According to an example embodiment, an audio input engine 150 may be configured to receive audio input 151. According to an example embodiment, the audio input engine 150 may receive the audio input 151 from audio input devices internal or external to the transporting object 140. For example, the audio input 151 may include instructions for the mobile image processing manager 102. For example, the audio input 151 may include audio data for output via the audio output engine 146.

According to an example embodiment, the scene determination engine 132 may be configured to determine the first group 134 based on one or more predetermined graphical character images 152. For example, the predetermined graphical character images 152 may include images associated with virtual characters, or images associated with real-life entities such as people or animals (e.g., pets, zoo animals).

According to an example embodiment, the navigational plan engine 124 may be configured to determine the navigational plan 126 based on the first set 106 and a predetermined navigational control scenario 154 associated with the one or more predetermined graphical character images 152. For example, the predetermined navigational control scenario 154 may include a navigational control scenario associated with predetermined scenarios (e.g., games, predetermined security navigational paths). For example, a predetermined safari game may include controls for navigation of the transporting object 140 in its observation environment (e.g., a house of its owner) as it provides a user perception of hunting for wild animals (which may be displayed on scenes augmented with jungle objects such as vines and underbrush, and the animals).

According to an example embodiment, the first surface may include a display surface associated with a user display device 116. For example, the first surface may include a television display or a mobile device display (e.g., smart phone display, tablet display, computer display).

According to an example embodiment, the scene determination engine 132 may be configured to determine the first group 134 based on one or more predetermined graphical virtual environment images 156. For example, the first group 134 may include images of cartoon characters, wild animals, jungle vines, rivers, waterfalls, and/or boulders.

According to an example embodiment, the navigational plan engine 124 may be configured to determine the navigational plan 126 based on one or more navigational user requests 158. For example, the navigational user requests 158 may be received from the user 112, from a device that may be located remote from the observation environment, or from a location in close proximity to the observation environment. For example, the user may provide the navigational user requests 158 via a keyboard, a button located on the transporting object 140, via gestures made in view of an image input device, or via predetermined sets of instructions (e.g., for security checks while the user is away from home or asleep).

According to an example embodiment, the scene determination engine 132 may be configured to determine the first group 134 based on combining one or more predetermined graphical virtual environment images 156 and at least a portion of the first set 106. For example, the scene determination engine 132 may include virtual characters or environmental objects (e.g., boulders, bouncing balls, buttons) in a scene that includes a wall of a house with a ledge on the wall. For example, the scene determination engine 132 may combine a ledge on a wall of the observation environment with a virtual bouncing ball, to be displayed via the image projection engine 136, as a ball bouncing on the ledge in the observation environment.

According to an example embodiment, the navigational plan engine 124 may be configured to determine the navigational plan 126 based on one or more navigational user requests 158.

According to an example embodiment, the user display device 116 may include one or more of a television display, a mobile device display, a computer display device, or a remote projector display device.

According to an example embodiment, the image data receiving engine 104 may be configured to obtain a second set 160 of three-dimensional 3-D image data associated with the observation environment. For example, a current display may include a target, or a button. For example, the second set 160 may include images associated with a person shooting at the target, or with a person extending a finger as though pressing the virtual displayed button, or with a person extending a hand as though bouncing a virtual displayed ball.

According to an example embodiment, the scene determination engine 132 may be configured to determine a second group 162 of one or more graphical images, based on a reaction to an event associated with the obtained second set 160 of three-dimensional 3-D image data. For example, the scene determination engine 132 may determine the second group 162 of graphical images for a next display, based on a display associated with the shooting of a target, or the depression of a button, or the bouncing of the ball on a ledge, in reaction to the user action(s) discussed above. As another example, the second group 162 may be determined based on new entities entering the observation environment (e.g., a family cat entering the line of sight, and the second set 162 may include a lion for display).

According to an example embodiment, the image projection engine 136 may be configured to initiate a display of the second group 162 on the first surface.

According to an example embodiment, the first surface may include a portion of the observation environment. For example, the first surface may include a wall of a house, a table, a chair, a ceiling, a box, a pet, or household objects.

According to an example embodiment, the scene determination engine 132 may be configured to determine the first group 134 based on one or more predetermined graphical virtual environment images 156. According to an example embodiment, the navigational plan engine 124 may be configured to determine the navigational plan 126 based on one or more navigational user requests 158.

According to an example embodiment, the scene determination engine 132 may be configured to determine the first group 134 based on image data received from an image data transmitter 163. For example, a remote user may transmit image data for use by the scene determination engine 132. According to an example embodiment, the navigational plan engine 124 may be configured to determine the navigational plan 126 based on one or more navigational requests received from a navigational request transmitter 164. For example, a remote user may send navigation information to the mobile image processing manager 102. For example, the remote user may request that the transporting object 140 move to a location to provide a view of a piece of furniture with a virtual ruler superimposed over it, so that a user may remotely determine the dimensions of objects in a house (e.g., for making decisions for purchases while in a hardware store, or while meeting with an interior designer).

According to an example embodiment, an orientation determination engine 166 may be configured to determine a 3-D orientation 168 of a first bounded 3-D area 170, based on the first set 106. For example, the 3-D orientation 168 may include geometrical 3-D attributes associated with objects in the observation environment. For example, the 3-D orientation may include 3-D attributes associated with a curved-surface vase (e.g., to determine a 3-D facial image for display on the surface of the vase).

According to an example embodiment, the scene determination engine 132 may be configured to determine the first group 134 of one or more graphical images based on the determined 3-D orientation 168. For example, if the 3-D orientation 168 includes 3-D attributes associated with a ledge or a chest of a person, the first group 134 may include a 3-D virtual ball for display as bouncing on the ledge, or a name tag for display as a 3-D name tag on the chest of the person. For example, if the 3-D orientation includes 3-D attributes associated with a shoe, a blue scarf, a potted plant, or a green piece of yarn, the first group 134 may include a boat for projection on a wall (or an a television display) as a boat on a river, with shrubbery and vines in the projected scene.

According to an example embodiment, the image projection engine 136 may be configured to initiate the display of the first group 134 to the first surface, the display based on the light source and the determined 3-D orientation 168.

According to an example embodiment, a matching engine 172 may be configured to determine a match 174 between a portion of the first bounded 3-D area 170 and one or more of the graphical images, based on the determined 3-D orientation 168. For example, the matching engine 172 may determine a match between the proportions of the curved surface of the vase, and may determine a virtual face that approximately matches the contour of the vase, for projection onto the vase. For example, the matching engine 172 may determine a graphical image of a boat (or river) that most closely matches the geometric shape and color of the shoe (or scarf), for projection in a virtual safari environment.

According to an example embodiment, the image projection engine 136 may be configured to initiate the display of the first group 134 to the first surface, the display based on the light source, the determined 3-D orientation 168, and the determined match 174.

According to an example embodiment, the matching engine 172 may be configured to determine the match 174 between the portion of the first bounded 3-D area 170 and one or more of the graphical images, based on the determined 3-D orientation 168, based on one or more 3-D geometric similarities 176 between the one or more graphical images and the portion of the first bounded 3-D area 170.

According to an example embodiment, the image projection engine 136 may be configured to initiate the display of the first group 134 to the first surface, the display based on a projection that is based on the light source, the determined 3-D orientation 168, and fitting the projection to the first surface based on the 3-D geometric similarities 176.

According to an example embodiment, the observation environment may include the first bounded 3-D area 170.

According to an example embodiment, the determined 3-D orientation 168 may include one or more of a contour associated with the observation environment, a color associated with the observation environment, a theme associated with the observation environment, or a 3-D geometric configuration associated with an observation object located in the observation environment.

According to an example embodiment, the image projection engine 136 may be configured to initiate the display of the first group 134 to the first surface, the display based on fitting a portion of the projection to a 3-D geometric configuration associated with a portion of the first surface. For example, the face may be projected to the surface of the vase, based on fitting the virtual image of the face to the real-world 3-D geometry of the surface of the vase.

According to an example embodiment, the user interface engine 110 may be configured to receive sensor data from one or more sensing devices. For example, the sensor data may include audio data received from an audio data input device 178 and/or tactile data received from a tactile data input device 180. For example, the audio data input device 178 may include one or more microphones. For example, the audio data may also be received from the user device 114.

According to an example embodiment, sensor data such as temperature and humidity may also be input to the user interface engine 110 via sensing devices associated with the transporting object 140. According to an example, the transporting object 140 may also include output devices (not shown) that may be configured to output sensory output such as controlled temperature air, odors, mist, steam, controlled sprays of ignited gunpowder or colored mist, bubbles, or fog (e.g., to provide effects for generated environments).

According to an example embodiment, a database 182 may be configured to persistently store data and information associated with the mobile image processing manager 102. Although the database 182 is shown as being located internal to the transporting object 140 in FIG. 1, one skilled in the art of data processing will appreciate that the database 182 may also be located external to the transporting object 140, or may be distributed in portions both internal and external to the transporting object 140 (e.g., over a network). For example, the database 182 may store information such as navigational information obtained by the mobile image processing manager 102 in navigation of areas (e.g., the observation environment) over time. Thus, the mobile image processing manager 102 may store cumulative knowledge with regard to navigating a house of an owner of the transporting object 140, or any other environment. Further, the mobile image processing manager 102 may store preferences and/or history information associated with users over time, as well as states of scenarios from previous interactive sessions.

According to an example embodiment, the mobile image processing manager 102 may collaborate with an interactive system 184. For example, the mobile image processing manager 102 may collaborate with one or more MICROSOFT XBOX systems. For example, two or more users may share augmented reality experiences via the interactive system 184. For example, two players may play a safari game on television, with both players viewing approximately the same images on their separate television display devices, with each player adding his/her own input as the safari progresses.

According to an example embodiment, the mobile image processing manager 102 may be configured to receive sensor data. For example, the sensor data may be received from one or more sensing devices. For example, the sensor data may include image data, audio data, temperature data, humidity data, and/or tactile data received from one or more sensing devices, that may be located on or in close proximity to the transporting object 140, or may be located remotely from the transporting object 140 (e.g., located in association with the user device 114).

According to an example embodiment, the mobile image processing manager 102 may be configured to initiate output of sensory data (e.g., odors, temperature-controlled air or mist, colored mist), in addition to image data and audio data. For example, the mobile image processing manager 102 may be configured to initiate output of fog to accompany a virtual environment display of a spooky scene with boiling caldrons on a table or wall of the observation environment (e.g., the observation environment may include a pot that may be processed as a caldron in the virtual environment).

Figure 2A:
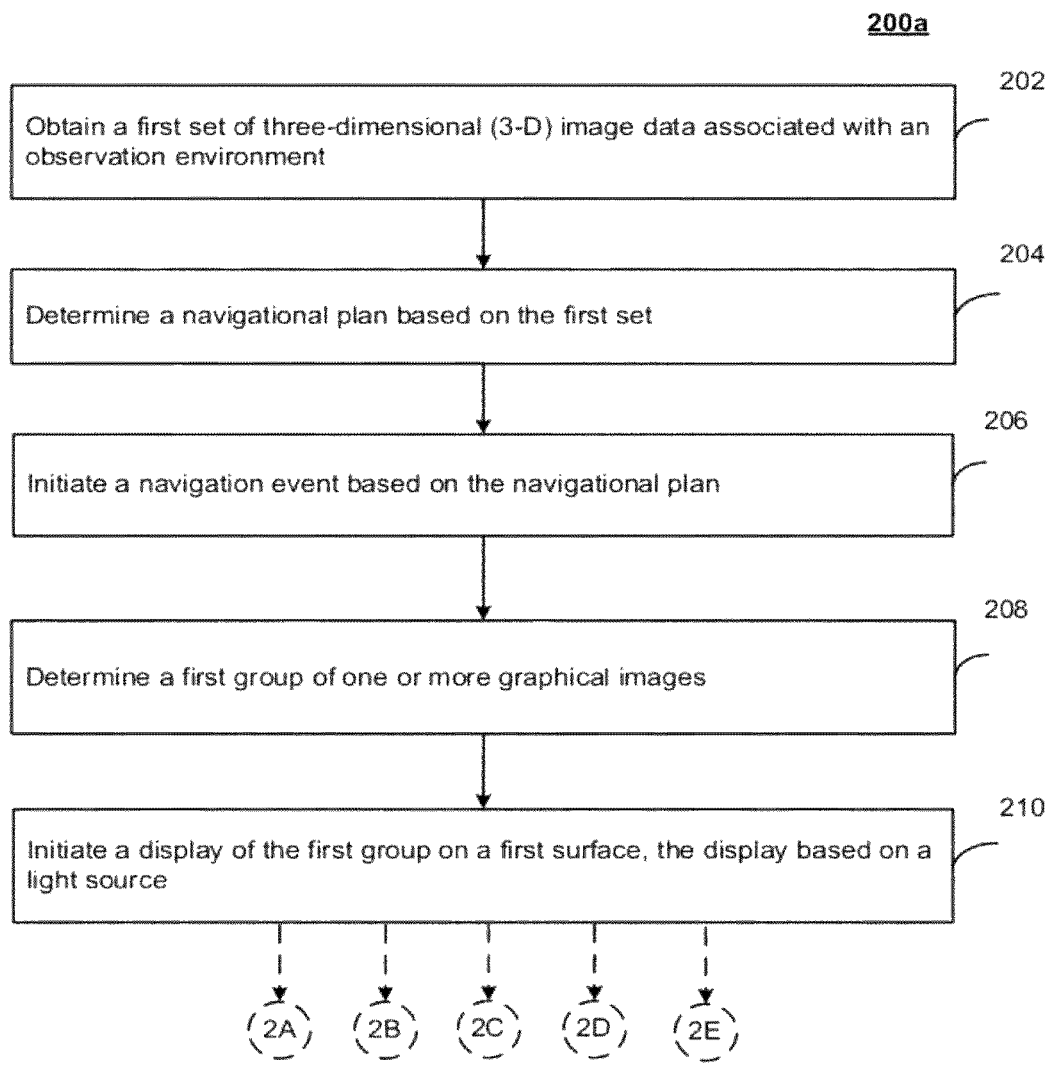
FIGS. 2a-2e are a flowchart illustrating example operations of the system of FIG. 1.
Figure 2B:
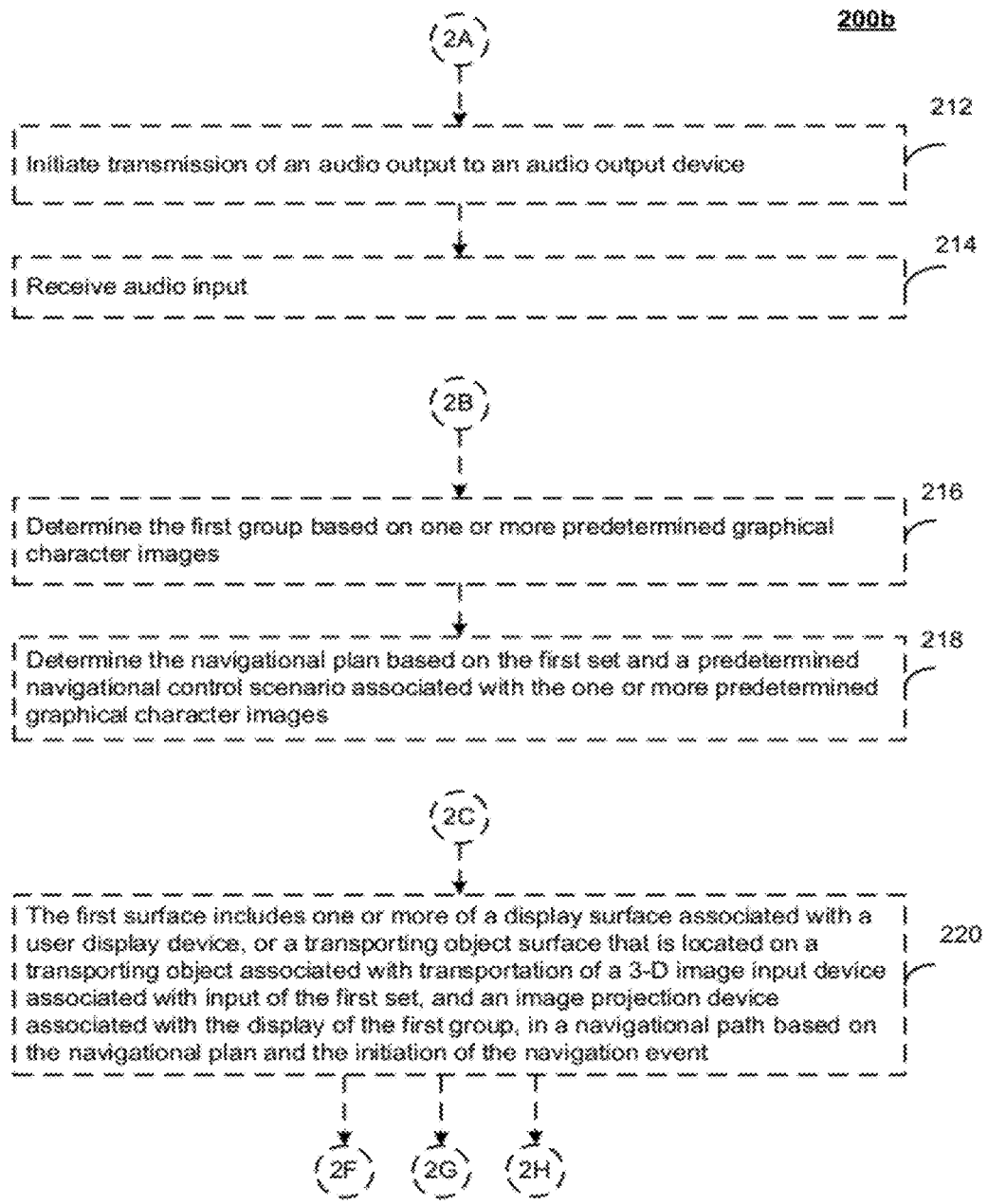
Figure 2C:
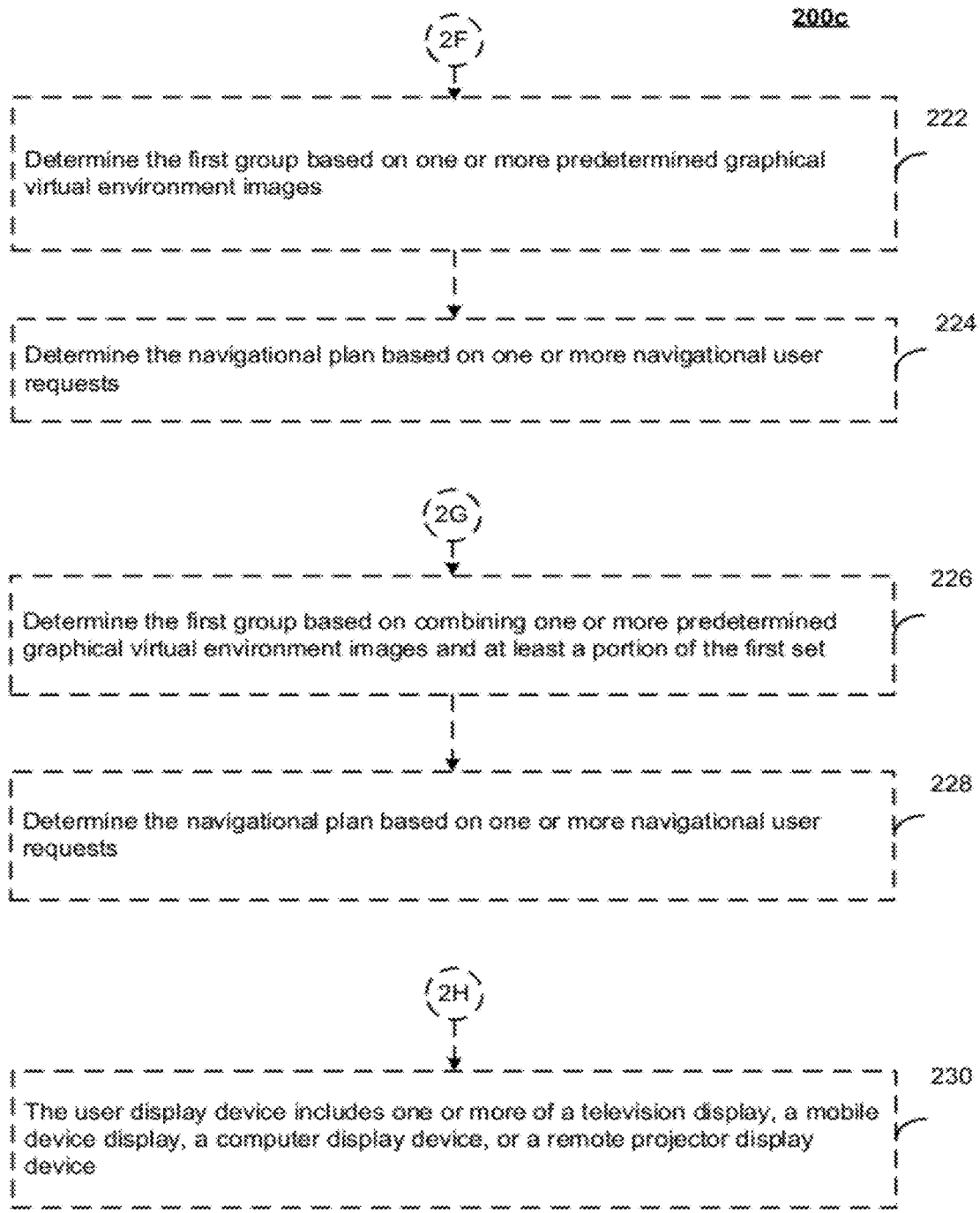
Figure 2D:
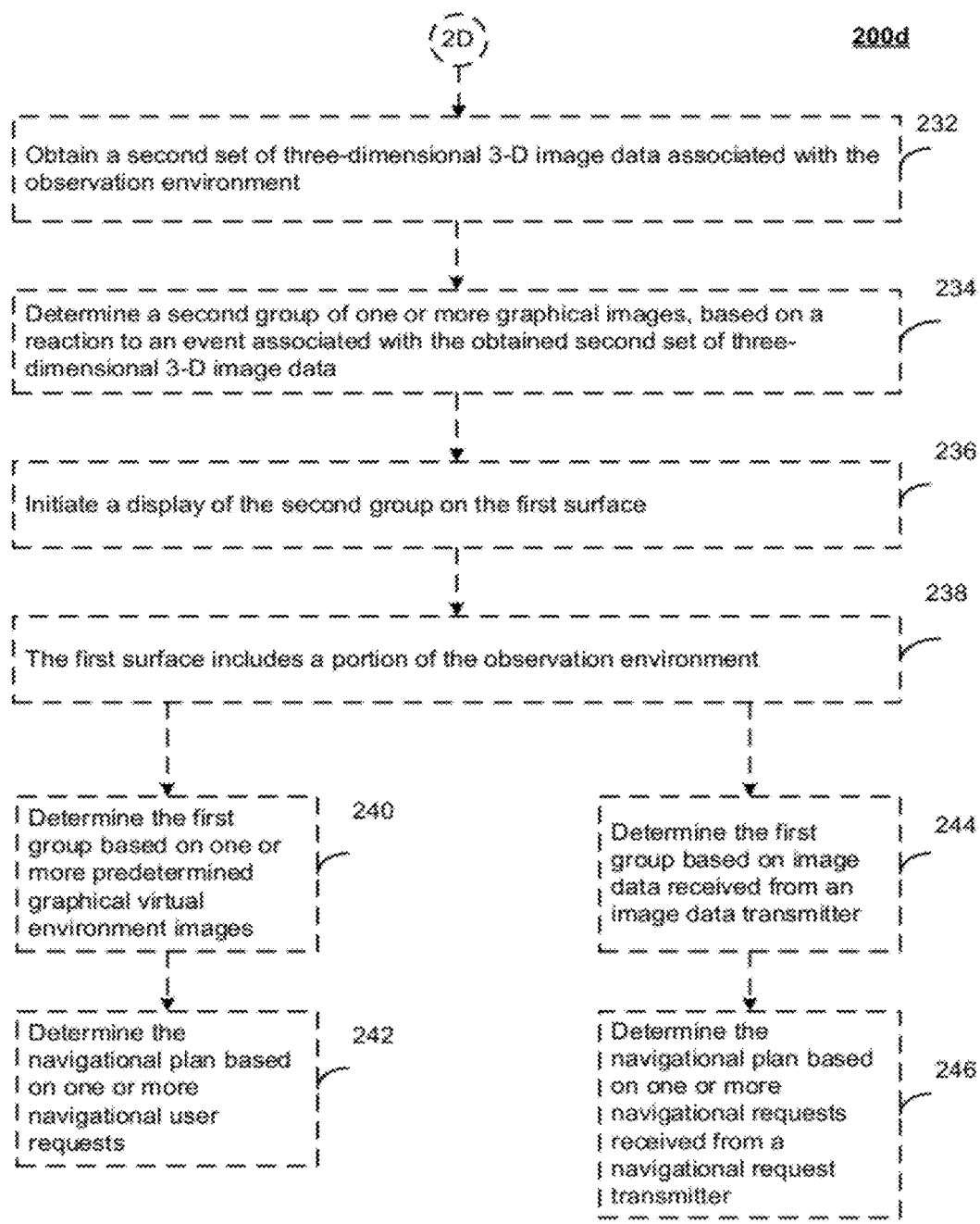
Figure 2E:
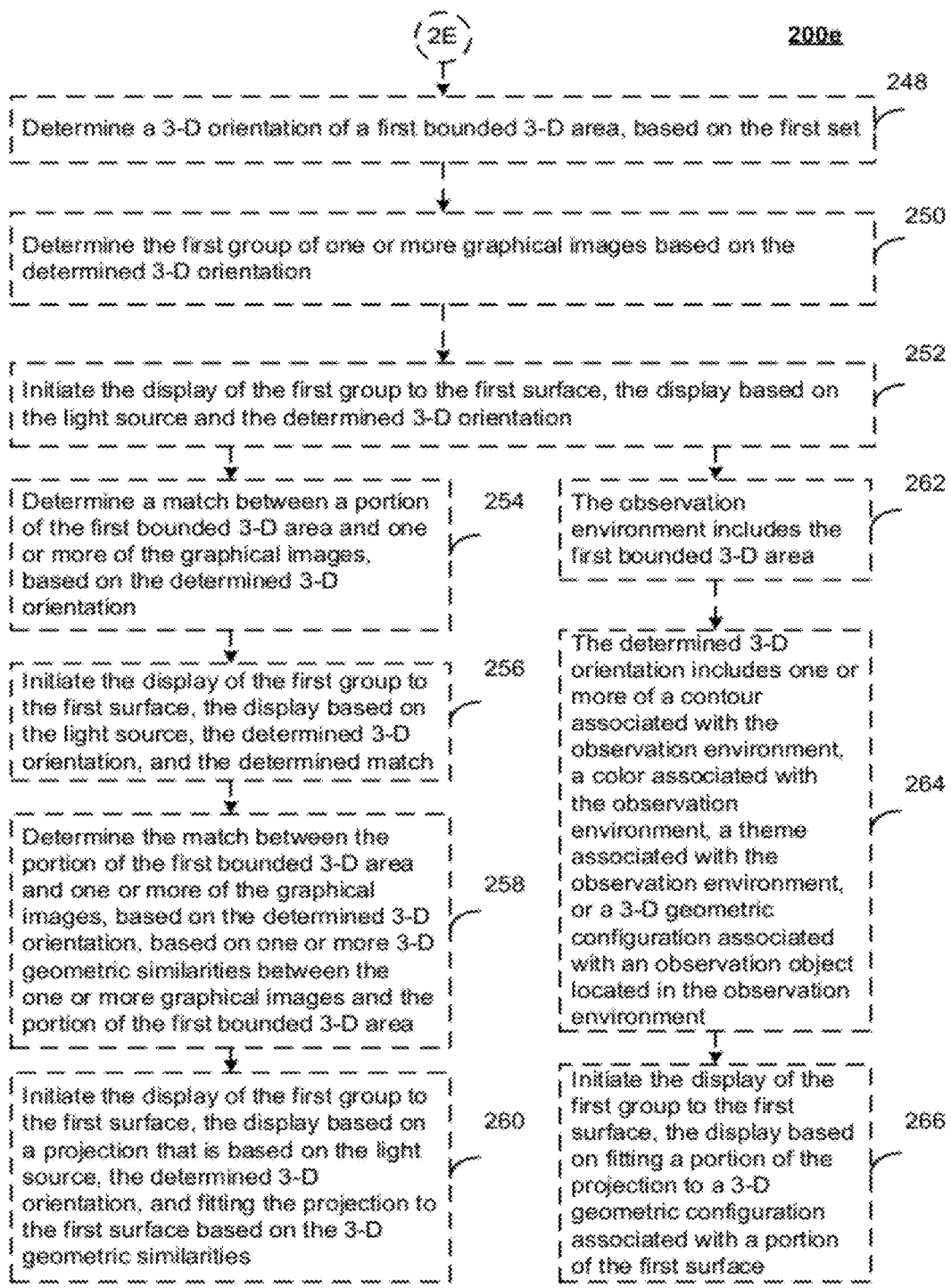

FIGS. 2a-2e are a flowchart illustrating example operations of the system of FIG. 1, according to an example embodiment. In the example of FIG. 2a, a first set of three-dimensional (3-D) image data associated with an observation environment may be obtained (202). For example, the image data receiving engine 104 may obtain the first set 106 of 3-D image data associated with an observation environment, as discussed above.

A navigational plan may be determined based on the first set (204). For example, the navigational plan engine 124 may determine a navigational plan 126 based on the first set 106, as discussed above. A navigation event may be initiated based on the navigational plan (206). For example, the navigation manager 128 may initiate the navigation event 130 based on the navigational plan 126, as discussed above.

A first group of one or more graphical images may be determined (208). For example, the scene determination engine 132 may determine the first group 134 of one or more graphical images, as discussed above.

A display of the first group on a first surface may be initiated, the display based on a light source (210). For example, the image projection engine 136 initiate a display of the first group 134 on a first surface, the display based on a light source, as discussed above.

According to an example embodiment, transmission of an audio output to an audio output device may be initiated (212). For example, the audio output engine 146 may initiate transmission of the audio output 147 to the audio output device 148, as discussed above.

According to an example embodiment, audio input may be received (212). For example, the audio input engine 150 may receive audio input 151, as discussed above.

According to an example embodiment, the first group may be determined based on one or more predetermined graphical character images (216). For example, the scene determination engine 132 may determine the first group 134 based on one or more predetermined graphical character images 152, as discussed above.

According to an example embodiment, the navigational plan may be determined based on the first set and a predetermined navigational control scenario associated with the one or more predetermined graphical character images (218). For example, the navigational plan engine 124 may determine the navigational plan 126 based on the first set 106 and a predetermined navigational control scenario 154 associated with the one or more predetermined graphical character images 152, as discussed above.

According to an example embodiment, the first surface may include one or more of a display surface associated with a user display device, or a transporting object surface that is located on a transporting object associated with transportation of a 3-D image input device associated with input of the first set, and an image projection device associated with the display of the first group, in a navigational path based on the navigational plan and the initiation of the navigation event (220).

According to an example embodiment, the first group may be determined based on one or more predetermined graphical virtual environment images (222). For example, the scene determination engine 132 may determine the first group 134 based on one or more predetermined graphical virtual environment images 156, as discussed above.

According to an example embodiment, the navigational plan may be determined based on one or more navigational user requests (224). For example, the navigational plan engine 124 may determine the navigational plan 126 based on one or more navigational user requests 158, as discussed above.

According to an example embodiment, the first group may be determined based on combining one or more predetermined graphical virtual environment images and at least a portion of the first set (226). For example, the scene determination engine 132 may determine the first group 134 based on combining one or more predetermined graphical virtual environment images 156 and at least a portion of the first set 106, as discussed above.

According to an example embodiment, the navigational plan may be determined based on one or more navigational user requests (228). For example, the navigational plan engine 124 may determine the navigational plan 126 based on one or more navigational user requests 158, as discussed above.

According to an example embodiment, the user display device may include one or more of a television display, a mobile device display, a computer display device, or a remote projector display device (230).

According to an example embodiment, a second set of three-dimensional 3-D image data associated with the observation environment may be obtained (232). For example, the image data receiving engine 104 may obtain the second set 160 of three-dimensional 3-D image data associated with the observation environment, as discussed above.

According to an example embodiment, a second group of one or more graphical images may be determined, based on a reaction to an event associated with the obtained second set of three-dimensional 3-D image data (234). For example, the scene determination engine 132 may determine the second group 162 of one or more graphical images, based on a reaction to an event associated with the obtained second set 160 of three-dimensional 3-D image data, as discussed above.

According to an example embodiment, a display of the second group on the first surface may be initiated (236). For example, the image projection engine 136 may initiate a display of the second group 162 on the first surface, as discussed above.

According to an example embodiment, the first surface may include a portion of the observation environment (238).

According to an example embodiment, the first group may be determined based on one or more predetermined graphical virtual environment images (240). For example, the scene determination engine 132 may determine the first group 134 based on one or more predetermined graphical virtual environment images 156, as discussed above. According to an example embodiment, the navigational plan may be determined based on one or more navigational user requests (242). For example, the navigational plan engine 124 may determine the navigational plan 126 based on one or more navigational user requests 158, as discussed above.

According to an example embodiment, the first group may be determined based on image data received from an image data transmitter (244). For example, the scene determination engine 132 may determine the first group 134 based on image data received from an image data transmitter 163, as discussed above.

According to an example embodiment, the navigational plan may be determined based on one or more navigational requests received from a navigational request transmitter (246). For example, the navigational plan engine 124 may determine the navigational plan 126 based on one or more navigational requests received from a navigational request transmitter 164, as discussed above.

According to an example embodiment, a 3-D orientation of a first bounded 3-D area may be determined, based on the first set (248). For example, the orientation determination engine 166 may determine the 3-D orientation 168 of the first bounded 3-D area 170, based on the first set 106, as discussed above.

According to an example embodiment, the first group of one or more graphical images may be determined based on the determined 3-D orientation (250). For example, the scene determination engine 132 may determine the first group 134 of one or more graphical images based on the determined 3-D orientation 168, as discussed above.

According to an example embodiment, the display of the first group to the first surface may be initiated, the display based on the light source and the determined 3-D orientation (252). For example, the image projection engine 136 may initiate the display of the first group 134 to the first surface, the display based on the light source and the determined 3-D orientation 168, as discussed above.

According to an example embodiment, a match between a portion of the first bounded 3-D area and one or more of the graphical images may be determined, based on the determined 3-D orientation (254). For example, the matching engine 172 may determine a match 174 between a portion of the first bounded 3-D area 170 and one or more of the graphical images, based on the determined 3-D orientation 168, as discussed above.

According to an example embodiment, the display of the first group to the first surface may be initiated, the display based on the light source, the determined 3-D orientation, and the determined match (256). For example, the image projection engine 136 may initiate the display of the first group 134 to the first surface, the display based on the light source, the determined 3-D orientation 168, and the determined match 174, as discussed above.

According to an example embodiment, the match between the portion of the first bounded 3-D area and one or more of the graphical images may be determined, based on the determined 3-D orientation, based on one or more 3-D geometric similarities between the one or more graphical images and the portion of the first bounded 3-D area (258). For example, the matching engine 172 may determine the match 174 between the portion of the first bounded 3-D area 170 and one or more of the graphical images, based on the determined 3-D orientation 168, based on one or more 3-D geometric similarities 176 between the one or more graphical images and the portion of the first bounded 3-D area 170, as discussed above.

According to an example embodiment, the display of the first group to the first surface may be initiated, the display based on a projection that is based on the light source, the determined 3-D orientation, and fitting the projection to the first surface based on the 3-D geometric similarities (260). For example, the image projection engine 136 may initiate the display of the first group 134 to the first surface, the display based on a projection that is based on the light source, the determined 3-D orientation 168, and fitting the projection to the first surface based on the 3-D geometric similarities 176, as discussed above.

According to an example embodiment, the observation environment may include the first bounded 3-D area (262). According to an example embodiment, the determined 3-D orientation may include one or more of a contour associated with the observation environment, a color associated with the observation environment, a theme associated with the observation environment, or a 3-D geometric configuration associated with an observation object located in the observation environment (264).

According to an example embodiment, the display of the first group to the first surface may be initiated, the display based on fitting a portion of the projection to a 3-D geometric configuration associated with a portion of the first surface (266). For example, the image projection engine 136 may be initiate the display of the first group 134 to the first surface, the display based on fitting a portion of the projection to a 3-D geometric configuration associated with a portion of the first surface, as discussed above.

Figure 3:
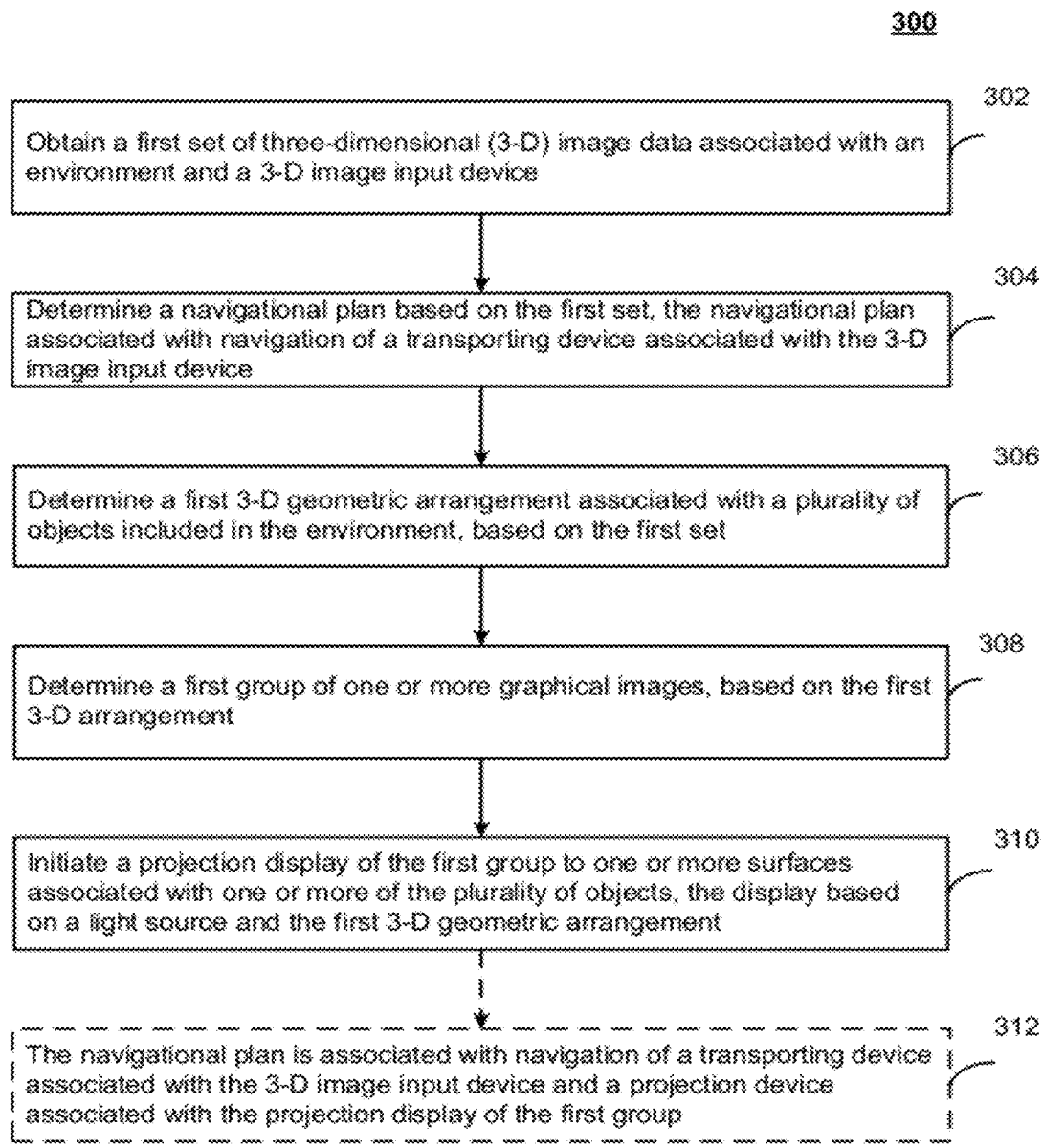
FIG. 3 is a flowchart illustrating example operations of the system of FIG. 1.

FIG. 3 is a flowchart 300 illustrating example operations of the system of FIG. 1, according to an example embodiment. In the example of FIG. 3, a first set of three-dimensional (3-D) image data associated with an environment and a 3-D image input device, may be obtained (302). For example, the image data receiving engine 104 may obtain the first set 106 of 3-D image data associated with an observation environment, as discussed above.

A navigational plan may be determined, via a device processor, based on the first set, the navigational plan associated with navigation of a transporting device associated with the 3-D image input device (304). For example, the navigational plan engine 124 may determine a navigational plan 126 based on the first set 106, as discussed above.

A first 3-D geometric arrangement associated with a plurality of objects included in the environment may be determined, based on the first set (306).

A first group of one or more graphical images may be determined, based on the first 3-D arrangement (308). For example, the scene determination engine 132 may determine the first group 134 of one or more graphical images, as discussed above.

A projection display of the first group to one or more surfaces associated with one or more of the plurality of objects may be initiated, the display based on a light source and the first 3-D geometric arrangement (310).

According to an example embodiment, the navigational plan may be associated with navigation of a transporting device associated with the 3-D image input device and a projection device associated with the projection display of the first group (312).

Figure 4A:
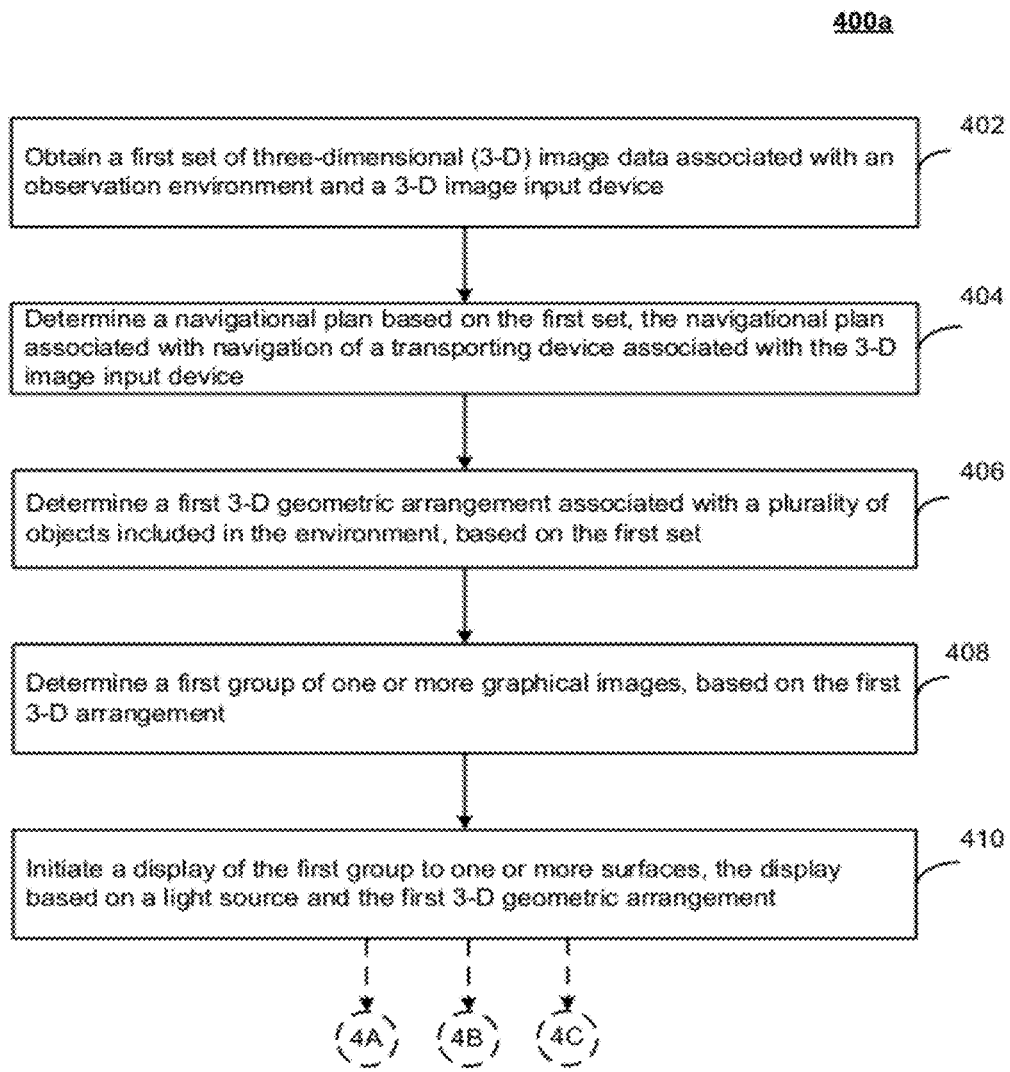
FIGS. 4a-4b are a flowchart illustrating example operations of the system of FIG. 1.
Figure 4B:
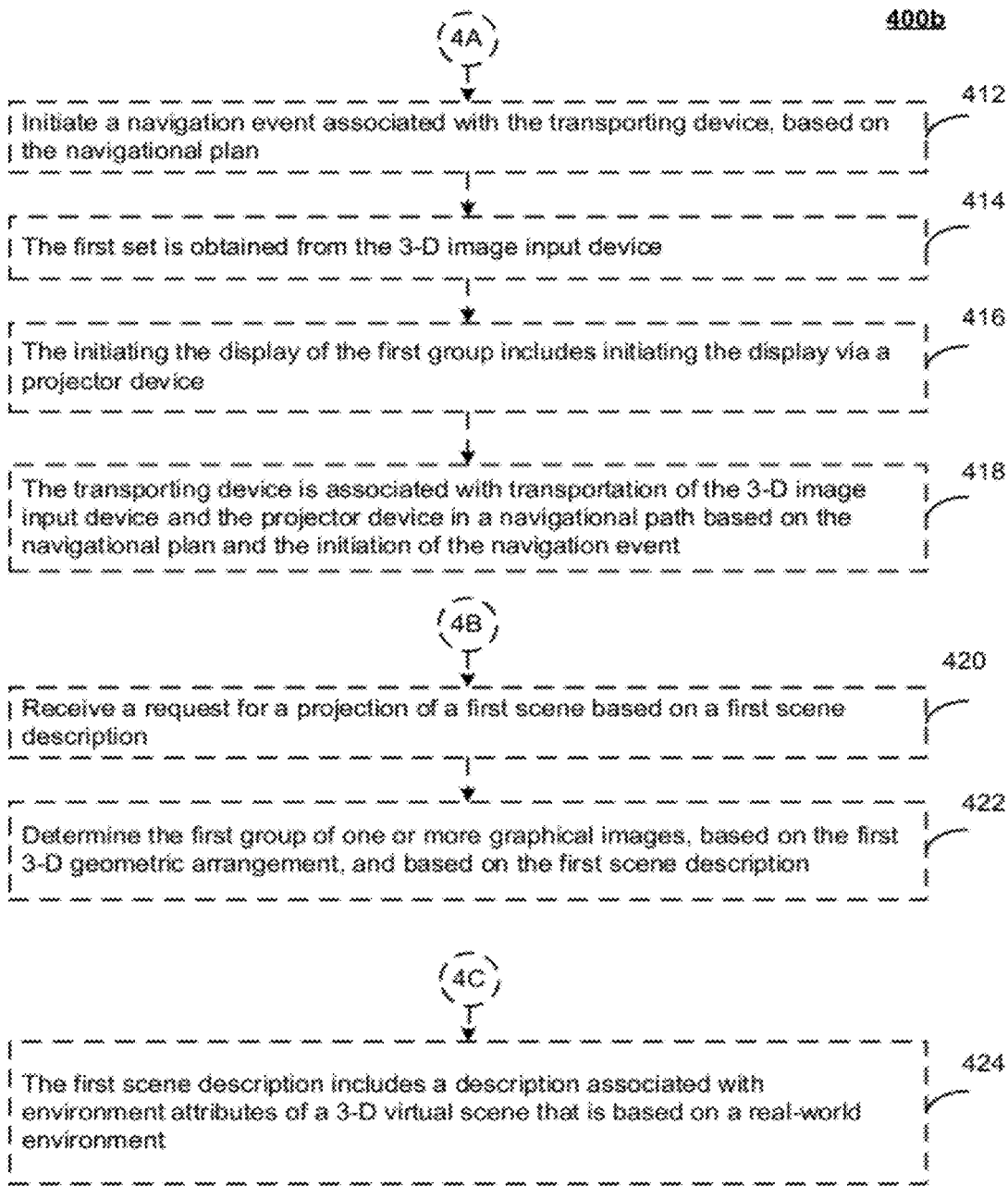

FIGS. 4a-4b are a flowchart 400 illustrating example operations of the system of FIG. 1, according to an example embodiment. In the example of FIG. 4a, a first set of three-dimensional (3-D) image data associated with an observation environment and a 3-D image input device, may be obtained (402). For example, the xxx, as discussed above. For example, the image data receiving engine 104 may obtain the first set 106 of 3-D image data associated with the observation environment, as discussed above.

A navigational plan may be determined based on the first set, the navigational plan associated with navigation of a transporting device associated with the 3-D image input device (404). For example, the navigational plan engine 124 may determine a navigational plan 126 based on the first set 106, as discussed above.

A first 3-D geometric arrangement associated with a plurality of objects included in the environment may be determined, based on the first set (406).

A first group of one or more graphical images may be determined, based on the first 3-D arrangement (408). For example, the scene determination engine 132 may determine the first group 134 of one or more graphical images, as discussed above.

A display of the first group to one or more surfaces may be initiated, the display based on a light source and the first 3-D geometric arrangement (410). For example, the image projection engine 136 may initiate a display of the first group 134, as discussed above.

According to an example embodiment, a navigation event associated with the transporting device may be initiated, based on the navigational plan (412). For example, the navigation manager 128 may initiate the navigation event 130 based on the navigational plan 126, as discussed above.

According to an example embodiment, the first set may be obtained from the 3-D image input device (414). For example, the first set 106 may be obtained from the 3-D image input device 142, as discussed above.

According to an example embodiment, the initiating the display of the first group may include initiating the display via a projector device (416). For example, the first set 106 may be displayed via the image projection device 144, as discussed above.

According to an example embodiment, the transporting device may be associated with transportation of the 3-D image input device and the projector device in a navigational path based on the navigational plan and the initiation of the navigation event (418).

According to an example embodiment, a request may be received for a projection of a first scene based on a first scene description (420). According to an example embodiment, determining the first group may include determining the first group of one or more graphical images, based on the first 3-D geometric arrangement, and based on the first scene description (422).

According to an example embodiment, the first scene description may include a description associated with environment attributes of a 3-D virtual scene that is based on a real-world environment (424). For example, the environment attributes may include one or more of a river, a body of water, a valley, a mountain, a jungle, a plant, an animal, a tree, a bush, a building, a vehicle, a boat, a piece of furniture, a piece of clothing, a person, a description of a facility, a description of a geographic area, a description of a social setting, or a description of a professional setting. One skilled in the art of data processing may appreciate that many other environment attributes may be used, without departing from the spirit of discussion herein.

Figure 5:
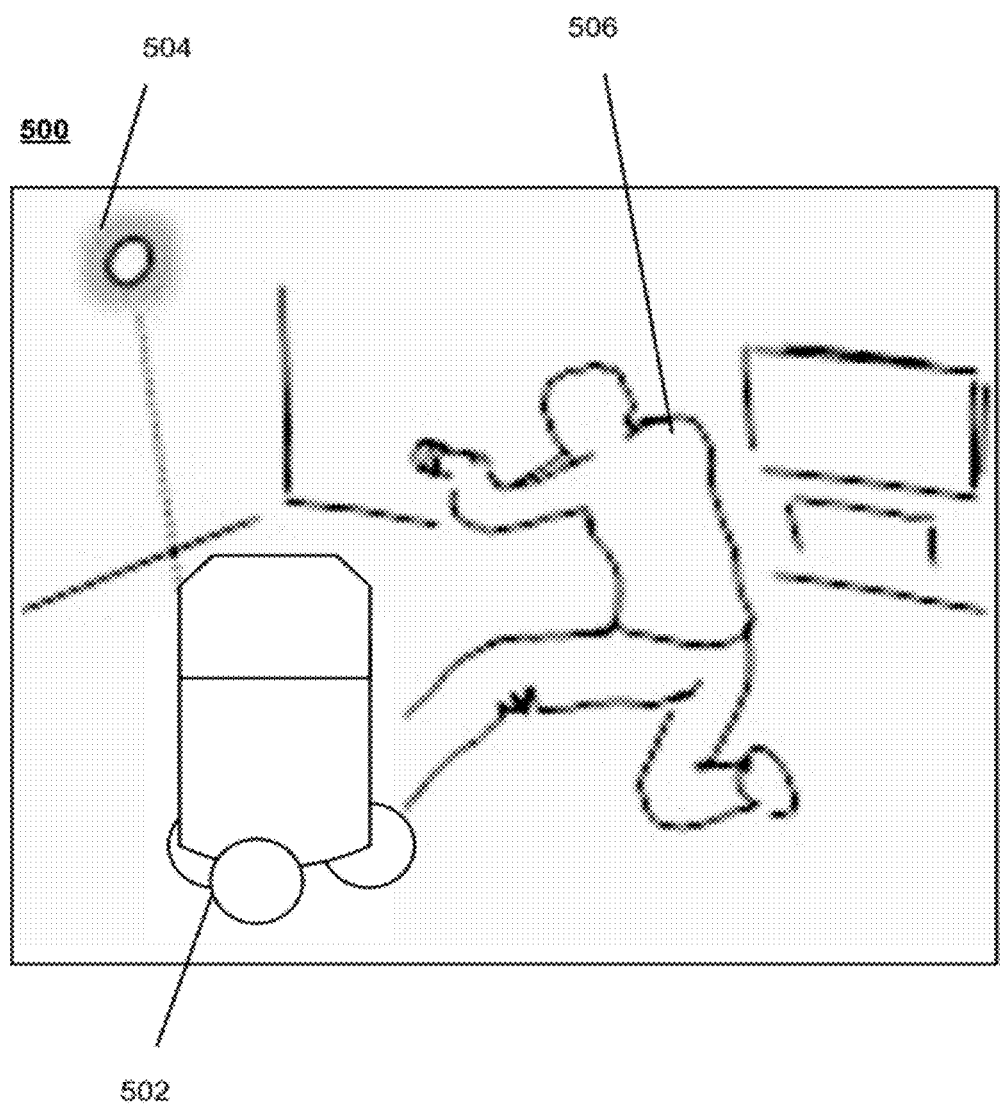
FIG. 5 depicts an example transporting object associated with the system of FIG. 1.

FIG. 5 depicts an example embodiment associated with the system of FIG. 1. According to an example embodiment, the transporting object 140 may be implemented as a robot structure 502. For example, the robot structure may include at least three wheels to provide mobility, an on-board processing system to accommodate the mobile image processing manager 102 and input/output devices.

As shown in FIG. 5, the mobile image processing manager 102 may project a scene such as a target 504 on a surface of the observation environment (e.g. a wall of a room in a house), and a user 506 may "shoot" the target with a user device such as a laser pointer. For example, the mobile image processing manager 102 may determine that the target has been penetrated in a particular spot, and may react by projecting the target 504 as a target with a smoking hole in the "hit" spot. For example, the example, the mobile image processing manager 102 may react by projecting the target 504 as a target with a hole in it, with a view of a scene on the other side of the wall appearing inside the projected hole (e.g., if there is another camera or mobile image processing manager 102 on the other side of the wall).

Figure 6:
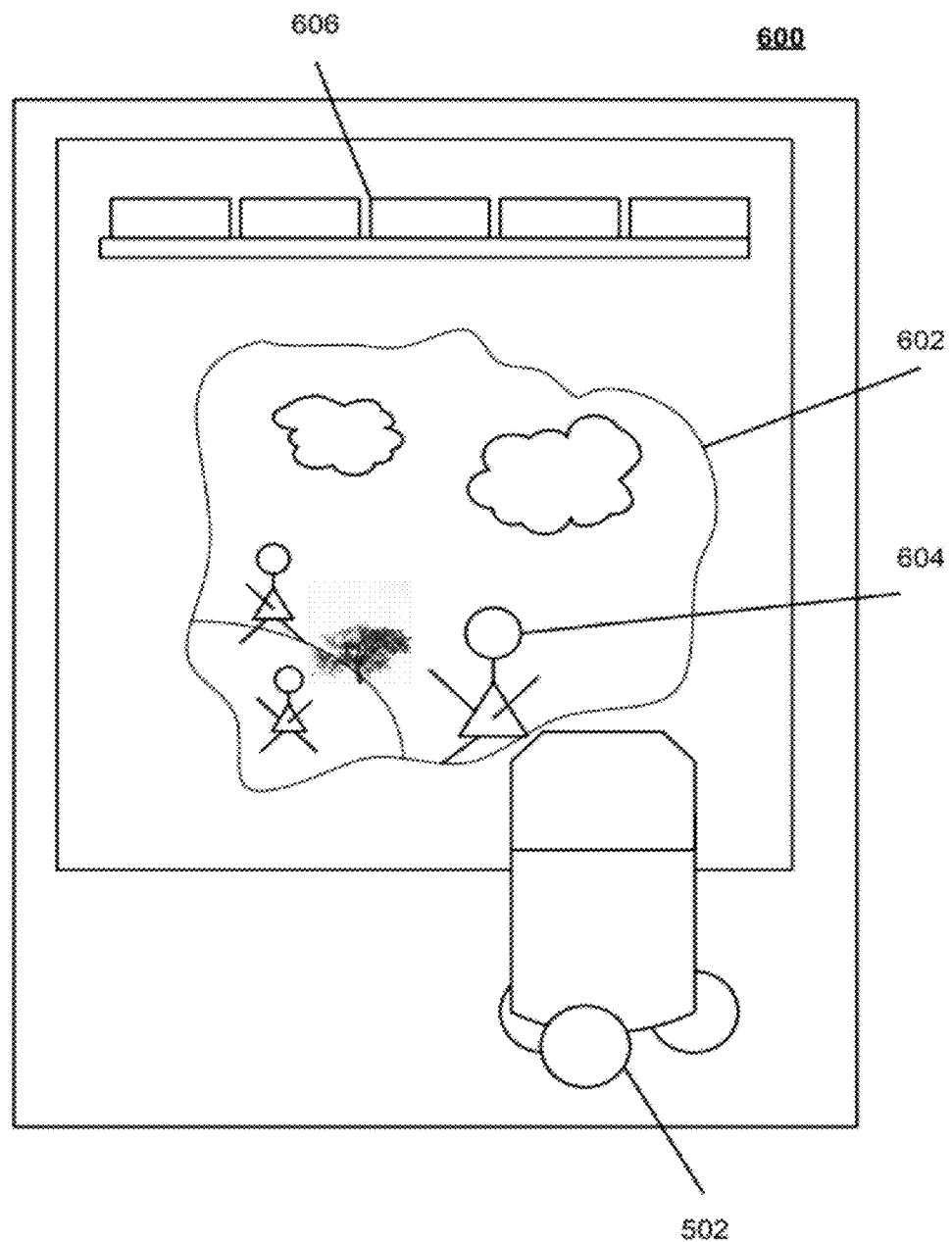
FIG. 6 depicts an example transporting object associated with the system of FIG. 1.

FIG. 6 depicts an example transporting object associated with the system of FIG. 1. As shown in FIG. 6, the mobile image processing manager 102 may project a virtual reality scene such as torn fabric 602 associated with a wall of the observation environment (e.g. a wall of a room in a house). For example, the virtual image of the torn fabric 602 may include a color that matches a color of the wall, and virtual characters 604 may be displayed as though they are peering into the room through a hole in the wall that is bounded by the torn fabric 602 (e.g., providing a perception that the virtual characters 604 live inside the wall). The user 502 (not shown in FIG. 6) may provide instructions to the mobile image processing manager 102 via verbal commands and/or gestures. For example, the user 502 may request the virtual characters verbally, while gesturing a proportional size for the projection on the wall. As shown in FIG. 6, a train on a ledge 606 may be included in input image data for the mobile image processing manager 102, and the train and/or ledge may be used to determine a scene and/or characters associated with a train or travel virtual scenario.

Figure 7:
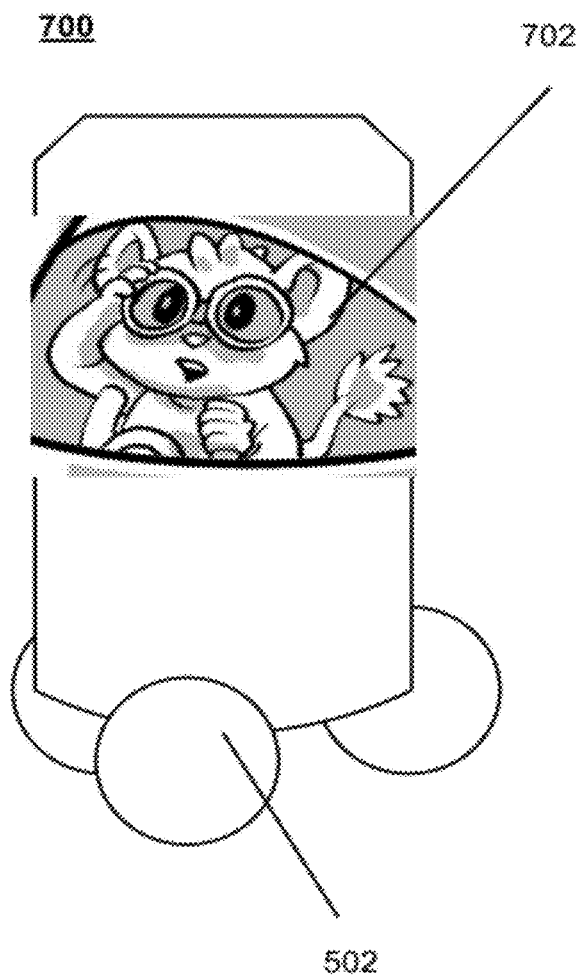
FIG. 7 depicts an example transporting object associated with the system of FIG. 1.

FIG. 7 depicts an example transporting object associated with the system of FIG. 1. For example, the robot structure 502 may include a screen 702 that may be configured to display scenes for viewing by a user, the scenes appearing on the external surface of the robot. For example, the scenes may include imaginary characters that may provide a perception to a user that the imaginary characters are inside the robot, controlling its movements and behavior. For example, the robot may project a character onto the screen as a character moving a steering wheel in directions in which the robot is currently moving (e.g., providing the visual perception that the virtual character is driving the robot, or controlling the robot). For example, the robot (e.g., via the navigation manager 128) may continuously sense its direction and orientation in its real-world environment via the 3-D image input device 142. For example, the character may include a predefined character that may be programmed into an application utilized by the mobile image processing manager 102, or may be collaboratively shared via the interactive system 184 (e.g., an XBOX system).

According to an example embodiment, a "visitor" may be allowed to control the robot (e.g., via the navigational request transmitter 164 and/or the image data transmitter 163). For example, the "visitor" may be provided with a network connection to the mobile image processing manager 102, and may transmit navigational signals to control the movement of the robot (e.g., the transporting object 140) through it environment. For example, the robot may capture 3-D images via the 3-D image input device and transmit the images to the "visitor" via the user device 114, so that the user 112 may be able to view the environment of the robot as it moves, and may control the direction of movement. According to an example embodiment, the user 112 may send image data (e.g., via the image data transmitter 163, which may be located on/in close proximity to the user device 114) to the system 100. For example, the robot may display the received image data, on a surface that is external to the robot, or on the surface of the robot itself.

For example, the "visitor" may "paint" or "draw" with light on walls and other objects in the environment of the robot. For example, the user 112 may use a remote user device 114 that may include a second robot (e.g., a second mobile processing manager 102). For example, the "visitor" (e.g., user 112) may employ the image projection device 144 to display images on the observation environment.

According to an example embodiment, the user 112 may manipulate virtual objects generated by the mobile image processing manager 102. For example, the user 112 may press virtual 3-D buttons, bounce or hit virtual balls, capture virtual characters, or pick up virtual objects (e.g., gaming objects).

According to an example embodiment, virtual characters may appear to react to the environment (e.g., projected virtual characters may climb onto real-world ledges, chairs or other surfaces in the observation environment).

According to an example embodiment, the mobile image processing manager 102 may provide media display virtually anywhere. For example, video or other media may be displayed in children's rooms, tree houses, or tents. For example, the mobile image processing manager 102 may provide projected music visualizations and/or album art.

According to an example embodiment, the mobile image processing manager 102 may provide projections of virtual imagery representing the interior assembly of an object. For example, the mobile image processing manager 102 may project on a person or a pet (e.g., a dog or cat) imagery representing the anatomy of that animal (e.g., the digestive system, or heart or lungs). For example, the internal organs of the person or animal may be displayed as a 3-D display, as though the person or animal were surgically opened for organ viewing (e.g., for anatomical study or for surgery).

As another example, the mobile image processing manager 102 may project on an appliance (e.g., a refrigerator, washer, or dryer) imagery representing the mechanisms and components internal to the appliance (e.g., to aid in repair operations).

According to an example embodiment, the mobile image processing manager 102 may perceive contact with a user interface device. For example, depth image detection may determine a user contact with virtual user interface (e.g., a 3-D button projected on a surface, with a user finger appearing to depress the 3-D button).

According to an example embodiment, the mobile image processing manager 102 may provide static or dynamic projected 3-D artwork that may match the geometry of a room.

As another example, the mobile image processing manager 102 may project a virtual ruler/tape-measure onto walls or other spaces and send the combined image of the measuring device with the wall or space to a mobile device associated with the user 112. This technique may be used remotely (while embodying the mobile image processing manager 102) to measure spaces in the home while the user 112 is at a store selecting furniture for the home.

According to an example embodiment, the mobile image processing manager 102 may provide a game involving a treasure hunt, whereby users may try to find objects in the house.

As another example, the mobile image processing manager 102 may request the user 112 to place a specific object in a specific location in the observation environment.

As another example, the mobile image processing manager 102 may project virtual projects (e.g., a garden) in a room of a house. For example, a project may include planting seeds and caring for plants. For example, the user 112 and the transporting object 140 (e.g., the robot structure 502) may form a team to work together to tend the virtual garden. For example, the mobile image processing manager 102 may attract virtual animals to the virtual garden.

For example, the user 112 may use the mobile image processing manager 102 to "capture" (e.g., scan)/collect local animals to virtually live in the virtual garden. For example networked users may share/exchange animals collected.

According to an example embodiment, the user 112 may view his/her home/furniture via the images obtained by the mobile image processing manager 102, which may then be augmented, changed, and/or enhanced (e.g., virtually, without physical change).

According to an example embodiment, the user 112 may project new areas, windows, and places on walls of his/her home, as home design considerations. For example, the mobile image processing manager 102 may view an empty room and project images based on the input 3-D image data, and may project images of the empty room redecorated with furniture, a new wall color, and pets.

According to an example embodiment, the mobile image processing manager 102 may generate games within homes of users (e.g., providing sounds of approaching monster footsteps).

Example techniques discussed herein may provide mobile applications of augmented reality. For example, a mobile robot may navigate a building such as a home, and may input 3-D images of the observation environment (e.g., the visible environment of the building), and may determine a navigation plan based on the input (and other navigational input). The mobile robot may determine a scene that may include augmented reality images and/or other sensory data, and may initiate the augmented scene. The output may be projected within the observation environment, or on a display associated with the mobile robot (e.g., on a front surface of the mobile robot), or may be displayed on a remote/mobile device (e.g., a television display, computer display, or smart phone display).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
    a mobile image processing manager including:
        an image data receiving engine configured to obtain a first set of three-dimensional (3-D) image data associated with an observation environment that is within a line of sight of an image input device that is configured to sense at least a portion of the first set of 3-D image data;
        a navigational plan engine configured to determine a navigational plan for automatically controlling navigation of a mobile platform, the navigational plan determined based on the obtained 3-D image data in the first set;
        a navigation manager configured to automatically initiate a navigation event for the mobile platform based on the navigational plan;
        a scene determination engine configured to determine, via a device processor, a first group of one or more graphical images; and
        an image projection engine configured to initiate a display of the first group on a first surface, the display based on a light source, the first surface including one or more of:
            one or more objects located within the observation environment,
            a display associated with a transporting body associated with the mobile image processing manager,
            a display associated with a remote device located remotely from the observation environment, or
            a transporting object surface that is located on a transporting object associated with transportation of a 3-D image input device associated with input of the first set, and an image projection device associated with the display of the first group, in a navigational path based on the navigational plan and the initiation of the navigation event.

2. The system of claim 1, further comprising:
    an audio output engine configured to initiate transmission of an audio output to an audio output device; and
    an audio input engine configured to receive audio input.

3. The system of claim 1, wherein:
    the scene determination engine is configured to determine the first group based on one or more predetermined graphical character images, and
    the navigational plan engine is configured to determine the navigational plan based on the first set and a predetermined navigational control scenario associated with the one or more predetermined graphical character images.

4. The system of claim 1, wherein:
    the first surface includes:
        a display surface associated with a user display device.

5. The system of claim 4, wherein:
    the user display device includes one or more of:
        a television display, a mobile device display, a computer display device, or a remote projector display device.

6. The system of claim 1, wherein:
    the scene determination engine is configured to determine the first group based on one or more predetermined graphical virtual environment images, and the navigational plan engine is configured to determine the navigational plan based on one or more navigational user requests.

7. The system of claim 1, wherein:
the scene determination engine is configured to determine the first group based on combining one or more predetermined graphical virtual environment images and at least a portion of the first set, and
the navigational plan engine is configured to determine the navigational plan based on one or more navigational user requests.

8. The system of claim 1, wherein:
the image data receiving engine is configured to obtain a second set of 3-D image data associated with the observation environment,
the scene determination engine is configured to determine a second group of one or more graphical images, based on a reaction to an event associated with the obtained second set of 3-D image data,
the image projection engine is configured to initiate a display of the second group on the first surface, and
the first surface includes a portion of the observation environment.

9. The system of claim 8, wherein:
the scene determination engine is configured to determine the first group based on one or more predetermined graphical virtual environment images, and
the navigational plan engine is configured to determine the navigational plan based on one or more navigational user requests.

10. The system of claim 8, wherein:
the scene determination engine is configured to determine the first group based on image data received from an image data transmitter, and
the navigational plan engine is configured to determine the navigational plan based on one or more navigational requests received from a navigational request transmitter.

11. The system of claim 1, further comprising:
an orientation determination engine configured to determine a 3-D orientation of a first bounded 3-D area, based on the first set, wherein
the scene determination engine is configured to determine the first group of one or more graphical images based on the determined 3-D orientation, and
the image projection engine is configured to initiate the display of the first group to the first surface, the display based on the light source and the determined 3-D orientation.

12. The system of claim 11, further comprising:
a matching engine configured to determine a match between a portion of the first bounded 3-D area and one or more of the graphical images, based on the determined 3-D orientation, wherein
the image projection engine is configured to initiate the display of the first group to the first surface, the display based on the light source, the determined 3-D orientation, and the determined match.

13. The system of claim 12, wherein:
the matching engine is configured to determine the match between the portion of the first bounded 3-D area and one or more of the graphical images, based on the determined 3-D orientation, based on one or more 3-D geometric similarities between the one or more graphical images and the portion of the first bounded 3-D area, wherein the image projection engine is configured to initiate the display of the first group to the first surface, the display based on a projection that is based on the light source, the determined 3-D orientation, and fitting the projection to the first surface based on the 3-D geometric similarities.

14. The system of claim 11, wherein:
the observation environment includes the first bounded 3-D area, and
the determined 3-D orientation includes one or more of:
a contour associated with the observation environment,
a color associated with the observation environment,
a theme associated with the observation environment,
or a 3-D geometric configuration associated with an observation object located in the observation environment, wherein
the image projection engine is configured to initiate the display of the first group to the first surface, the display based on fitting a portion of the projection to a 3-D geometric configuration associated with a portion of the first surface.

15. A method comprising:
obtaining a first set of three-dimensional (3-D) image data associated with an environment that is within a line of sight of a 3-D image input device that is configured to sense at least a portion of the first set of 3-D image data;
determining, via a device processor, a navigational plan for automatically controlling navigation of a mobile platform, the navigational plan determined based on the obtained 3-D image data in the first set, the navigational plan associated with automated navigation of a transporting device associated with the 3-D image input device;
determining a first 3-D geometric arrangement of a plurality of objects included in the environment, based on the first set;
determining a first group of one or more graphical images, based on the first 3-D arrangement; and
initiating a projection display of the first group to one or more surfaces of one or more of the plurality of objects, the display based on a light source and the first 3-D geometric arrangement.

16. The method of claim 15, wherein:
the navigational plan is associated with navigation of a transporting device associated with the 3-D image input device and a projection device associated with the projection display of the first group.

17. A computer program product comprising a machine readable storage device tangibly storing executable code that, when executed by one or more processors, causes at least one data processing apparatus to:
obtain a first set of three-dimensional (3-D) image data associated with an observation environment that is within a line of sight of a 3-D image input device that is configured to sense at least a portion of the first set of 3-D image data;
determine a navigational plan for automatically controlling navigation of a transporting device based on the obtained 3-D image data in the first set, the navigational plan associated with automated navigation of the transporting device, that is associated with the 3-D image input device;
determine a first 3-D geometric arrangement of a plurality of objects included in the environment, based on the first set;
determine a first group of one or more graphical images, based on the first 3-D arrangement; and initiate a display of the first group to one or more surfaces, the display based on a light source and the first 3-D geometric arrangement, the one or more surfaces including one or more of:
- one or more objects located within the observation environment,
- a display associated with the transporting device that is automatically controlled,
- a display associated with a remote device located remotely from the observation environment and the transporting device, or
- a transporting object surface that is located on the transporting device associated with transportation of the 3-D image input device, and an image projection device associated with the display of the first group, in a navigational path based on the navigational plan.

18. The computer program product of claim 17, wherein the executable code, when executed, causes the at least one data processing apparatus to:

initiate a navigation event associated with the transporting device, based on the navigational plan, wherein the first set is obtained from the 3-D image input device, and the initiating the display of the first group includes initiating the display via a projector device, wherein the transporting device is associated with transportation of the 3-D image input device and the projector device in a navigational path based on the navigational plan and the initiation of the navigation event.

19. The computer program product of claim 17, wherein the executable code, when executed, causes the at least one data processing apparatus to:

receive a request for a projection of a first scene based on a first scene description, wherein the determining the first group includes determining the first group of one or more graphical images, based on the first 3-D geometric arrangement, and based on the first scene description.

20. The computer program product of claim 19, wherein:

the first scene description includes a description associated with environment attributes of a 3-D virtual scene that is based on a real-world environment.

* * * * *